United States Patent
Nishina

[19]

[11] Patent Number: 6,128,968
[45] Date of Patent: Oct. 10, 2000

[54] CONSTANT-PRESSURE MECHANISM AND CONSTANT-TORQUE MECHANISM

[75] Inventor: Shingo Nishina, Kawasaki, Japan

[73] Assignee: Mitutuyo Corporation, Kawasaki, Japan

[21] Appl. No.: 09/263,888

[22] Filed: Mar. 8, 1999

[30] Foreign Application Priority Data

Mar. 13, 1998 [JP] Japan ................... 10-082788

[51] Int. Cl.$^7$ .................................................. F16H 21/44
[52] U.S. Cl. .................................................. 74/99 A
[58] Field of Search ................... 74/828, 99 A; 33/815; 73/862.53, 790, 818

[56] References Cited

U.S. PATENT DOCUMENTS

| | | | |
|---|---|---|---|
| 1,630,110 | 5/1927 | Cole .......................................... | 73/818 |
| 4,420,888 | 12/1983 | Wakao et al. . | |
| 4,775,086 | 10/1988 | Kataoka . | |
| 5,419,237 | 5/1995 | Jeppsson ............................. | 74/99 A X |

FOREIGN PATENT DOCUMENTS

| | | |
|---|---|---|
| 0802351 | 10/1997 | European Pat. Off. . |
| 0864392 | 9/1998 | European Pat. Off. . |
| 54-160266 | 12/1979 | Japan . |
| 04212030 | 8/1992 | Japan . |
| Y2-5-21324 | 6/1993 | Japan . |
| 2136572 | 9/1984 | United Kingdom . |

*Primary Examiner*—Rodney H. Bonck
*Attorney, Agent, or Firm*—Oliff & Berridge, PLC

[57] ABSTRACT

A constant-pressure mechanism includes: a pressure transmission member being linearly movable in a predetermined direction and being urged by an urging member; a rotary member being rotatable around a central shaft located in a case receiving the pressure transmission member; a follower member supported to the case so as to be movable linearly; and a displacement conversion mechanism interposed among the pressure transmission member, the rotary member and the follower member. The displacement conversion mechanism has a first link arm pin-connected between one end portion of the rotary member and the pressure transmission member, and a second link arm pin-connected between the other end portion of the rotary member and the follower member.

17 Claims, 16 Drawing Sheets

CONSTANT-PRESSURE MECHANISM AND CONSTANT-TORQUE MECHANISM

BACKGROUND OF THE INVENTION

1. Field of the Invention

The present invention relates to a constant-pressure mechanism and a constant-torque mechanism used, for example, in a contact measuring apparatus or the like.

2. Description of the Related Art

As well known, for example, in a measuring apparatus such as a dial gauge or the like, a contact (measuring member) is pressed against a surface to be measured by a force of a coil spring so that measurement is carried out. However, in a configuration where the contact is pressed by the coil spring simply, the urging force of the coil spring varies depending on its deflected state. Therefore, there is a problem that the contact pressure varies whenever the contact moves.

That is, when the urging force of the coil spring varies in conjunction with a quantity of movement of the contact, the contact pressure of the contact against the surface to be measured varies on all such occasions. As a result, by a reaction force corresponding to the contact pressure, the surface to be measured per se may be deformed, or the state where the subject to be measured is supported may be changed, so that it is impossible to obtain a proper result of measurement or a reproducible result of measurement.

Therefore, in the related art, a constant-pressure mechanism for urging a contact with a substantially constant force that is independent of a quantity of movement of the contact has been proposed, for example, in JP-A-54-160266. That is, in this constant-pressure mechanism, without using such a coil spring the elastic force of which is changed in conjunction its displacement quantity, a contact is fixed to a pneumatic piston so as to be urged by the pressure of an air chamber on which a constant air pressure acts.

According to such a related constant-pressure mechanism, it is possible to keep the measuring pressure of a contact substantially constant independently of a quantity of movement of the contact. It is however necessary to dispose a base portion of the contact in the inside of an air chamber in which the air pressure is kept constant. Therefore, the structure for supporting the contact becomes so large in size that it is inconvenient to handle the constant-pressure mechanism, or the constant-pressure mechanism is an obstacle for measurement in a narrow space.

Further, although a mechanism for obtaining a constant torque has been proposed in JP-Y-5-21324, this constant-torque mechanism is intended for a screw driver. Therefore, the mechanism is so complicated that it is impossible to apply the mechanism to a simple measuring apparatus such as a caliper gauge.

SUMMARY OF THE INVENTION

In view of the foregoing problems of the related constant-pressure mechanisms and constant-torque mechanisms, it is an object of the present invention is to provide a small-sized constant-pressure mechanism and a small-sized constant-torque mechanism which are suitable for a contact measuring apparatus or the like, and which are simple in structure.

In order to achieve the above object, the present invention is characterized by the following features.

(1) A constant-pressure mechanism includes:

a pressure transmission member being linearly movable in a predetermined direction and being urged by an urging member;

a rotary member being rotatable around a central shaft located in a case receiving the pressure transmission member;

a follower member supported to the case so as to be movable linearly; and a displacement conversion mechanism interposed among the pressure transmission member, the rotary member and the follower member, the displacement conversion mechanism having a first link arm pin-connected between one end portion of the rotary member and the pressure transmission member, and a second link arm pin-connected between the other end portion of the rotary member and the follower member.

(2) The constant-pressure mechanism according to (1), wherein the follower member is supported along a direction substantially parallel to the predetermined direction.

(3) The constant-pressure mechanism according to (2), wherein the follower member is aligned with the pressure transmission member so as to be guided along the same direction as the movement of the pressure transmission member.

(4) The constant-pressure mechanism according to (1), wherein the follower member is supported along a direction substantially perpendicular to the predetermined direction.

(5) The constant-pressure mechanism according to (1), wherein the urging member is constituted by a tension coil spring.

(6) The constant-pressure mechanism according to (1), wherein a contact of a contact measuring apparatus is fixed to the follower member.

(7) The constant-pressure mechanism according to (1), wherein a contact of a contact measuring apparatus is formed in a portion of the follower member.

(8) A constant-pressure mechanism includes:

a pressure transmission member being linearly movable in a predetermined direction and being urged by an urging member;

a follower member being linearly movable and interlocking with the movement of the pressure transmission member; and a displacement conversion cam mechanism interposed between the pressure transmission member and the follower member, the displacement conversion cam mechanism converting a quantity of movement of one of the pressure transmission member and the follower member into a quantity of quadratic-functional movement of the other of the pressure transmission member and the follower member.

(9) The constant-pressure mechanism according to (8), wherein a contact of a contact measuring apparatus is fixed to the follower member.

(10) The constant-pressure mechanism according to (8), wherein a contact of a contact measuring apparatus is formed in a portion of the follower member.

(11) The constant-pressure mechanism according to (8), wherein the follower member is guided and supported along a direction substantially perpendicular to the predetermined direction.

(12) The constant-pressure mechanism according to (8), wherein the follower member is guided and supported along a direction substantially parallel to the predetermined direction.

(13) The constant-pressure mechanism according to (12), further including:

an intermediate member being movable substantially perpendicular to the predetermined direction, wherein the displacement conversion cam mechanism includes:
a movement-quantity conversion cam mechanism for converting a quantity of movement of one of the pressure transmission member and the follower member into a quantity of quadratic-functional movement of the intermediate member; and
a motion conversion cam portion for converting a quantity of the movement of the intermediate member into a quantity of movement in the direction of movement of the other of the pressure transmission member and the follower member.

(14) The constant-pressure mechanism according to (12), wherein the pressure transmission member is constituted by a pressure transmission sleeve being slidably received in the inside of a cylindrical case but being prevented from rotating;
the follower member is constituted by a follower sleeve being slidably received in the inside of the cylindrical case but being prevented from rotating, and the follower sleeve is aligned with the pressure transmission sleeve;
an intermediate shaft being rotatable freely is received between the pressure transmission sleeve and the follower sleeve; and
the displacement conversion cam mechanism comprises: a movement-quantity conversion cam portion defining a quadratic-functional relation between a quantity of movement of one of the pressure transmission sleeve and the follower sleeve and a rotation angle of the intermediate shaft, and a motion conversion cam portion converting rotational motion of the intermediate shaft into a quantity of linear movement of the other of the pressure transmission sleeve and the follower sleeve.

(15) The constant-pressure mechanism according to (8), further including:
a rotary member being rotatable around a central shaft located in a case receiving the pressure transmission member,
wherein the displacement conversion cam mechanism is disposed among the pressure transmission member, the rotary member and the follower member, and the displacement conversion cam mechanism converts a quantity of movement of the pressure transmission member into a quantity of quadratic-functional movement of the follower member.

(16) The constant-pressure mechanism according to (15), wherein the displacement conversion cam mechanism is constructed by a quadratic-functional cam groove formed in the rotary member.

(17) A constant-torque mechanism for imparting torque to a rotary disk supported rotatably by an elastic force of an urging member, comprising:
a pressure transmission sleeve received in the inside of a cylindrical case so as to be slidable but being prevented from rotating in a state where the pressure transmission sleeve is urged by the urging member;
an intermediate shaft which is rotatable freely and which acts as a support shaft for the rotary disk received in the inside of the pressure transmission sleeve; and
a displacement conversion cam mechanism interposed between the pressure transmission sleeve and the intermediate shaft, for converting a quantity of movement of the pressure transmission sleeve into a quadratic-functional rotational angle of the intermediate shaft.

DETAILED DESCRIPTION OF THE PREFERRED EMBODIMENT

Embodiments of the present invention will be described in detail below with reference to the drawings.

[First Embodiment]

Figure 1:
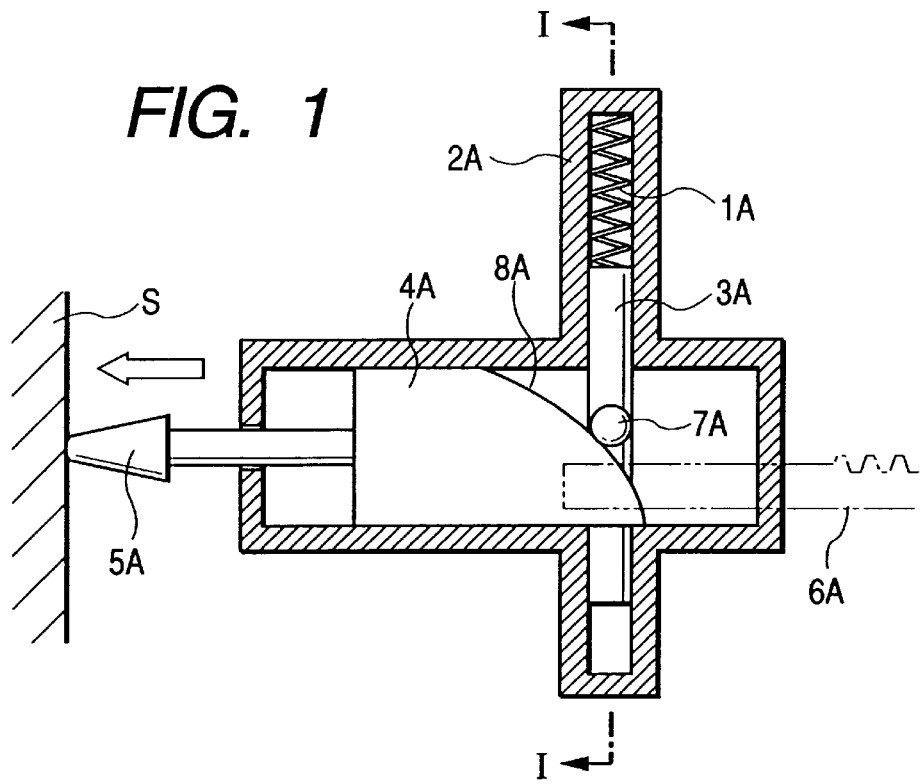
FIG. 1 is a sectional view of a constant-pressure mechanism according to a first embodiment of the present invention.
Figure 2:
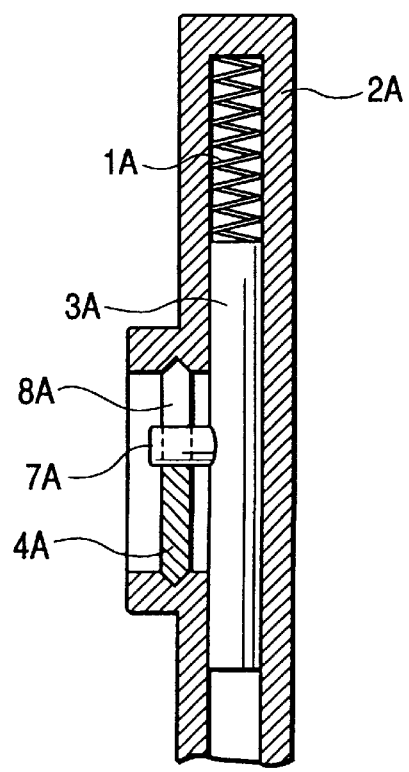
FIG. 2 is a sectional view of the constant-pressure mechanism taken along the line I—I in FIG. 1.

FIGS. 1 and 2 show a constant-pressure mechanism according to a first embodiment of the present invention, in which a pressure transmission member 3A pressed by a coil spring 1A is disposed in the inside of a case 2A receiving the coil spring 1A so that the pressure transmission member 3A is slidable in one direction.

Further, a follower member 4A which is slidable in a direction perpendicular to the direction of movement of the pressure transmission member 3A is disposed in the inside of the case 2A. A contact 5A which is able to contact, at its tip, with a surface S to be measured is fixed to one end of the follower member 4A, while a rack member 6A shown by the two-dot chain line of FIG. 1 is fixed to the other end of the follower member 4A. The quantity of movement of the contact SA is measured by the rack member 6A.

To make the follower member 4A follow the linear sliding motion of the pressure transmission member 3A, a displacement conversion cam mechanism is provided between the pressure transmission member 3A and the follower member 4A. The cam mechanism is constituted by an urging pin 7A attached to the pressure transmission member 3A and a cam surface 8A formed as an end surface of the follower member 4A. With the cam mechanism thus structured, the value of an urging force Fc of the follower member 4A against the surface S to be measured is kept constant.

Figure 3:
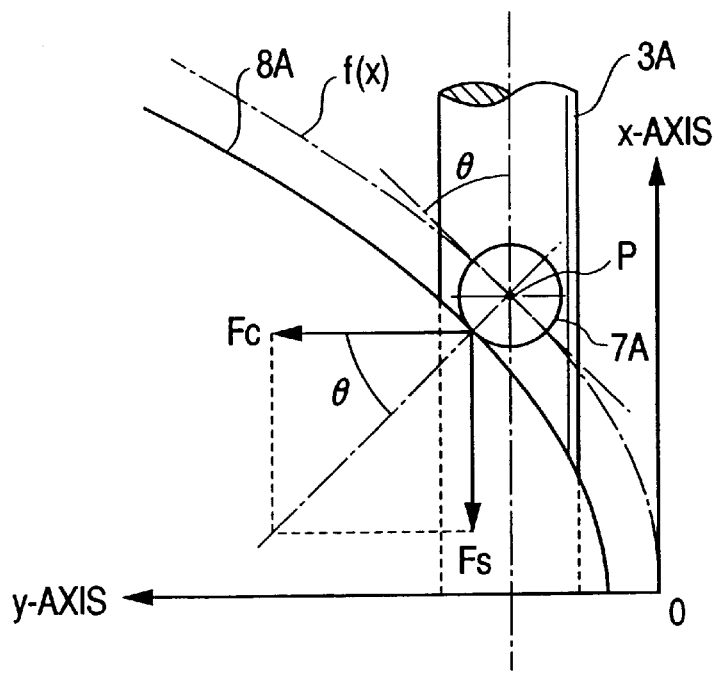
FIG. 3 is a principle explanatory diagram of the constant-pressure mechanism.

FIG. 3 is a principle diagram of the aforementioned displacement conversion cam mechanism. Assume that the sliding direction of the pressure transmission member 3A is designated as x-axis, and the sliding direction of the follower member 4A is designated as y-axis. In this case, assume that θ designates the inclination angle of the cam surface 8A with respect to the x-axis in the position where the urging pin 7A is in contact with the cam surface 8, and "Fs" designates the urging force of the coil spring 1A against the pressure transmission member 3A, then the urging force Fc of the follower member 4A in the y-axis direction is expressed by:

$$Fc = \frac{Fs}{\tan\theta} \quad \text{(Equation 1)}$$

Here, if a shape of the cam surface 8A is given such that a curve f(x) which is drawn as locus of the center of the urging pin 7A moving in contact with the cam surface 8A becomes $y = ax^2$, the following relation is established.

$$\tan\theta = \frac{dy}{dx} = 2ax \quad (a : \text{constant})$$

Further, assuming that "k" designates the spring constant of the coil spring 1A, then the coil spring 1A can be positioned so that the urging force Fs of the coil spring 1A is expressed by:

Fs=kx

Under these conditions, Equation 1 can be transformed into:

$$Fc = \frac{k}{2a} \quad \text{(Equation 2)}$$

That is, Equation 2 shows that the urging force Fc of the follower member 4A is constant independently of the position of the pressure transmission member 3A or the follower member 4A if the cam surface 8A has a quadratic curve or a curve approximated thereto.

[Second Embodiment]

Figure 4:
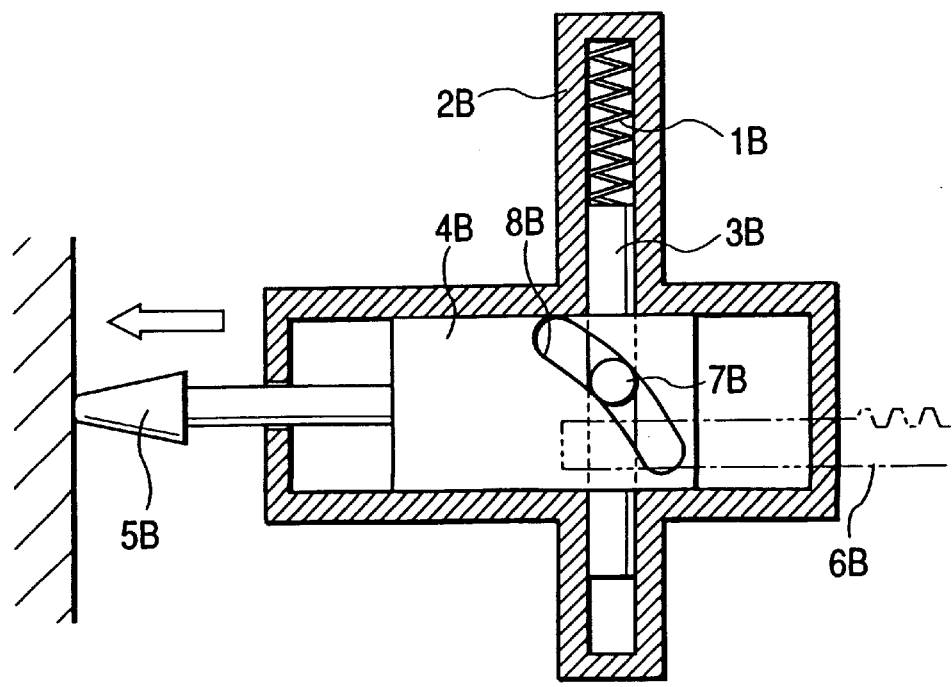
FIG. 4 is a sectional view of a constant-pressure mechanism according to a second embodiment of the present invention.

FIG. 4 shows a constant-pressure mechanism according to a second embodiment of the present invention. In FIG. 4, parts similar to those in the first embodiment described with reference to FIGS. 1 and 2 are referenced with the suffix "B" added to the corresponding numerals.

The second embodiment is characterized in that the aforementioned cam surface 8A is transformed as a quadratic curve cam groove 8B. Accordingly, the elastic force of a coil spring 1B is transmitted to a follower member 4B through a displacement conversion cam mechanism constituted by an urging pin 7B and the quadratic curve cam groove 8B.

Therefore, it is a matter of course that, by means of the constant-pressure mechanism of the second embodiment, an effect similar to that in the first embodiment can be obtained.

The aforementioned first and second embodiments have been described about the case of the constant-pressure mechanism in which the urging pins 7A and 7B are provided in the pressure transmission members 3A and 3B respectively, and the cam surface 8A and the quadratic curve cam groove 8B are provided in the follower members 4A and 4B respectively. However, the cam surface 8A and the quadratic curve cam groove 8B may be provided in the pressure transmission members 3A and 3B respectively, and follower pins following the cam surface 8A and the quadratic curve cam groove 8B may be provided in the follower members 4A and 4B respectively.

[Third Embodiment]

Figure 5:
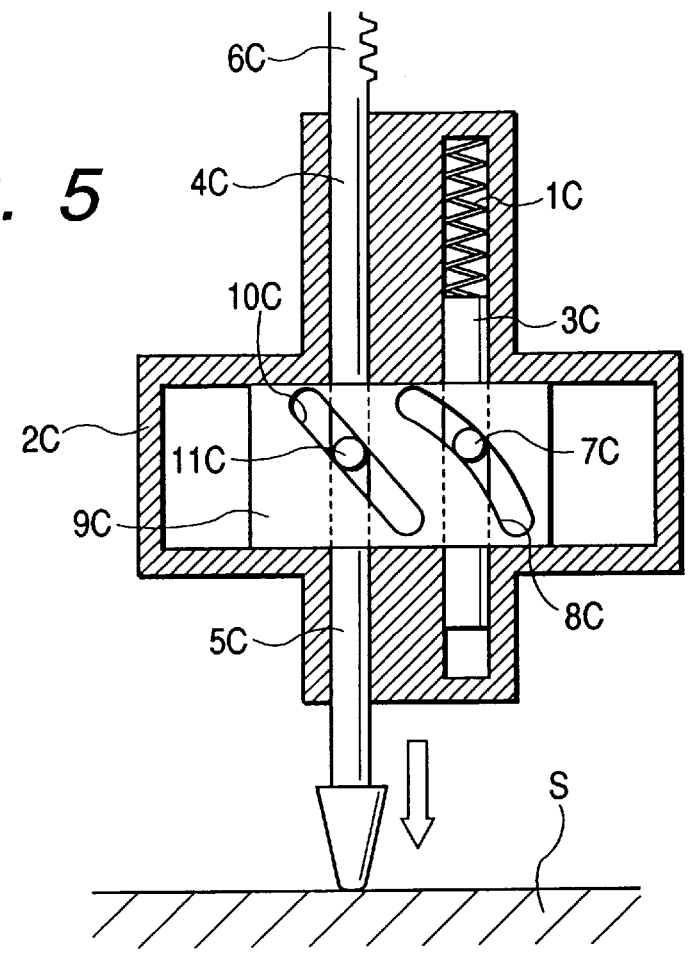
FIG. 5 is a sectional view of a constant-pressure mechanism according to a third embodiment of the present invention.

FIG. 5 is a constant-pressure mechanism according to a third embodiment of the present invention. This constant-pressure mechanism has a follower member 4C which is slidable in a direction parallel to the direction of movement of a pressure transmission member 3C urged by a coil spring 1C. That is, a lower end portion of the follower member 4C penetrating a case 2C is provided with a contact 5C which is able to contact, at its tip, with a surface to be measured, while a rack member 6C for transmitting a quantity of an axial movement of the contact 5C to a measurement portion is fixed to an upper end portion of the follower member 4C.

Further, an intermediate member 9C which is movable horizontally between the pressure transmission member 3C and the follower member 4C is disposed in the inside of the case 2C. A displacement conversion cam mechanism is provided among the intermediate member 9C, the pressure transmission member 3C and the follower member 4C, so that a direction and a quantity of movement of the pressure transmission member 3C are converted by the displacement conversion cam mechanism, and transmitted to the follower member 4C.

In the case of the third embodiment, the displacement conversion cam mechanism is constituted by: an urging pin 7C attached to the pressure transmission member 3C; a quadratic curve cam groove 8C formed in the intermediate member 9C so that the urging pin 7C is disposed in the cam groove 8C; a direction conversion cam groove 10C formed like a straight line in the intermediate member 9C so as to face the follower member 4C and inclined at an angle of, for example, 45 degrees; and a follower pin 11C attached to the follower member 4C and disposed in the direction conversion cam groove 10C.

In other words, in the constant-pressure mechanism of the third embodiment, a quantity of movement of the pressure transmission member 3C is converted into a quantity of quadratic-functional movement of the intermediate member 9C by means of the displacement conversion cam mechanism, while a horizontal movement of the intermediate member 9C is converted into a vertical movement of the follower member 4C by the direction conversion cam groove 10C and the follower pin 11C.

[Fourth Embodiment]

Figure 6:
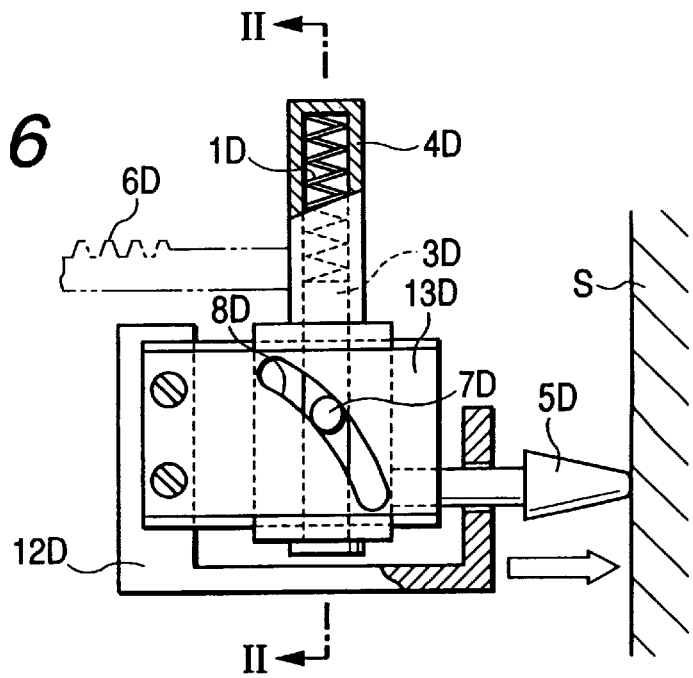
FIG. 6 is a partial cutaway front view of a constant-pressure mechanism according to a fourth embodiment of the present invention.
Figure 7:
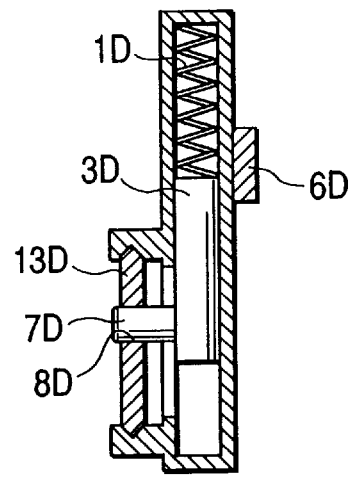
FIG. 7 is a sectional view of the constant-pressure mechanism taken along the line II—II in FIG. 6.

FIGS. 6 and 7 show a constant-pressure mechanism according to a fourth embodiment of the present invention. In this constant-pressure mechanism, a movable case 4D which is movable horizontally along a support plate 13D fixed to a U-shaped bracket 12D becomes a follower member.

That is, a pressure transmission member 3D which is urged by a coil spring 1D so as to be movable vertically is received in the inside of the movable case 4D, while an urging pin 7D projecting from the side surface of the movable case 4D is disposed in a quadratic curve cam groove 8D formed in the support plate 13D.

A contact 5D which is able to contact, at its tip, with a surface S to be measured is fixed to a right end portion of the movable case 4D, while a rack member 6D connected to a quantity-of-movement measuring portion is fixed to a left end portion of the movable case 4D.

According to the constant-pressure mechanism of the fourth embodiment thus structured, the constant-pressure mechanism has a structure in which the movable case 4D is urged in the arrow direction by a constant force based on the elastic force of the coil spring 1D.

Therefore, also in this structure, similarly to the first to third embodiments, it is possible to obtain such an effect that the tip of the contact 5D can be urged against the surface X to be measured by a force that is always constant independently of a movement of the contact 5D and hence a movement of the movable case 4D.

[Fifth Embodiment]

Figure 8:
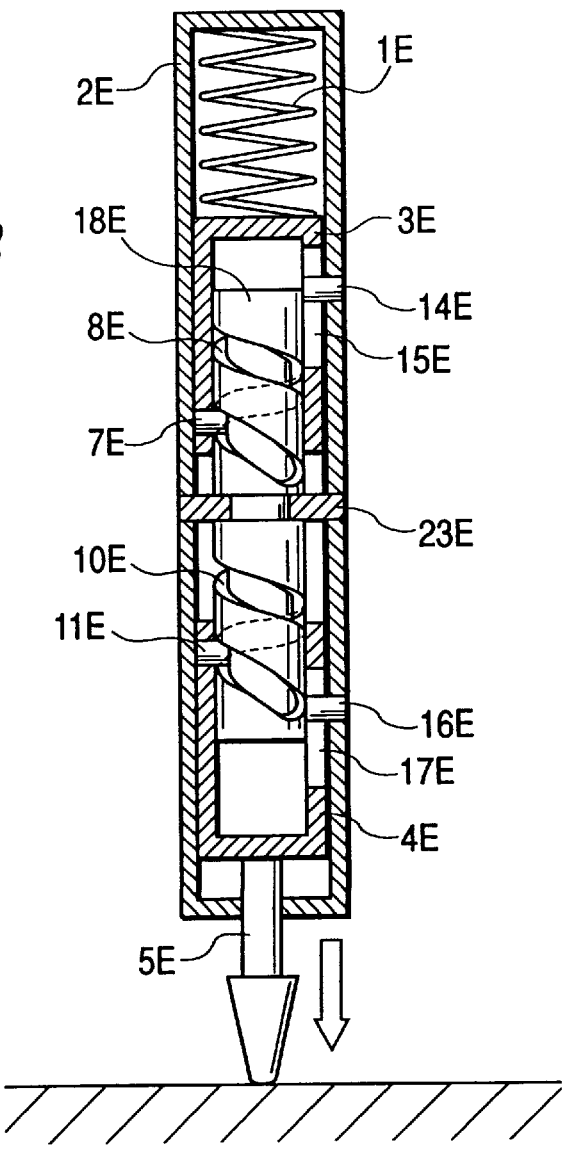
FIG. 8 is a sectional view of a constant-pressure mechanism according to a fifth embodiment of the present invention.

FIG. 8 shows a constant-pressure mechanism according to a fifth embodiment of the present invention, in which a pressure transmission sleeve 3E (pressure transmission member) and a follower sleeve 4E (follower member) which are prevented from rotational motion with respect to a cylindrical case 2E and which are movable axially are received in the inside of the cylindrical case 2E adjacently to each other in the longitudinal direction of the cylindrical case 2E.

That is, the pressure transmission sleeve 3E urged downward by a coil spring 1E is slidable vertically along a first long hole 15E to which a first guide pin 14E formed to project from the cylindrical case 2E is inserted. On the other hand, the follower sleeve 4E in which a contact 5E is fixed to the lower end thereof is slidable vertically along a second long hole 17E to which a second guide pin 16E formed to project from the cylindrical case 2E is inserted in the same manner.

Further, an intermediate shaft 18E which is rotatable freely with respect to the pressure transmission sleeve 3E and the follower sleeve 4E but is prevented from moving in the axial direction by a ring 23E is disposed between the pressure transmission sleeve 3E and the follower sleeve 4E. A displacement conversion cam mechanism is interposed among the pressure transmission sleeve 3E, the follower sleeve 4E and the intermediate shaft 18E. That is, a quadratic curve circumferential-surface groove 8E in which an urging pin 7E of the pressure transmission sleeve 3E is inserted is formed in an upper portion of the intermediate shaft 18E located within the pressure transmission sleeve 3E, while a motion conversion circumferential-surface groove 10E in which a follower pin 11E of the follower sleeve 4E is inserted is formed in a lower portion of the intermediate shaft 18E located within the follower sleeve 4E.

Therefore, in such a structure, a quantity of a linear movement of the pressure transmission sleeve 3E is converted into a quadratic-functional rotation angle of the intermediate shaft 18E, and the displacement of the rotation angle of the intermediate shaft 18E is converted into a quantity of a linear movement of the follower sleeve 4E again. It is therefore possible to urge the contact 5E against a surface S to be measured by constant pressure based on the coil spring 1E, independently of the movement of the contact 5E.

In the fifth embodiment, though not shown, a rack member penetrating the cylindrical case 2E so as to be led to the outside and integrated with the contact 5E is used, and this rack member is connected to a displacement measuring portion.

[Sixth Embodiment]

Figure 9:
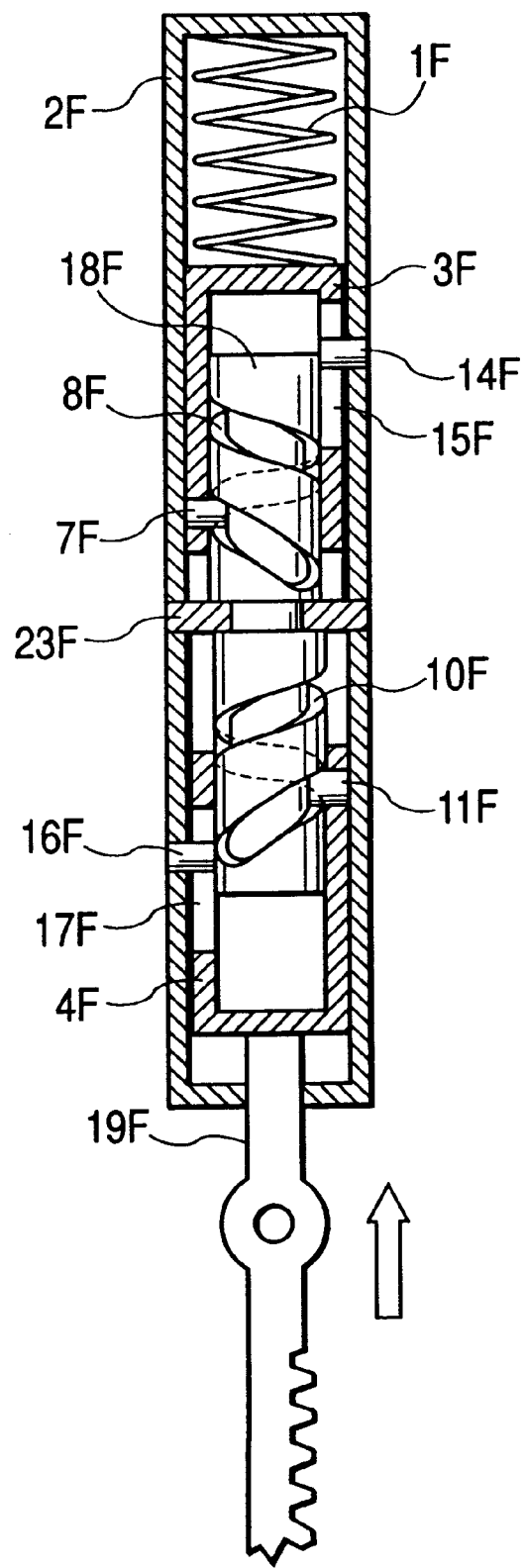
FIG. 9 is a sectional view of a constant-pressure mechanism according to a sixth embodiment of the present invention.

FIG. 9 shows a constant-pressure mechanism according to a sixth embodiment of the present invention. In FIG. 9, parts having the same structure as those in the fifth embodiment described with reference to FIG. 8 are referenced with the suffix "F" added to the corresponding numerals.

The sixth embodiment is characterized in that a motion conversion circumferential-surface groove 10F inclined, for example, at an angle of 45 degrees with respect to a plane perpendicular to the longitudinal direction of an intermediate shaft 18F is formed in the direction reverse to the motion conversion circumferential-surface groove 10E shown in FIG. 8.

Therefore, in the sixth embodiment shown in FIG. 9, it is possible to obtain a state where the follower sleeve 4F is always urged upward by a constant force based on the elastic force of the coil spring 1F. It is therefore possible to perform displacement measuring when a measuring member 19F is fixed to the follower sleeve 4F, and a subject to be measured is hooked on the measuring member 19F.

[Seventh Embodiment]

Figure 10:
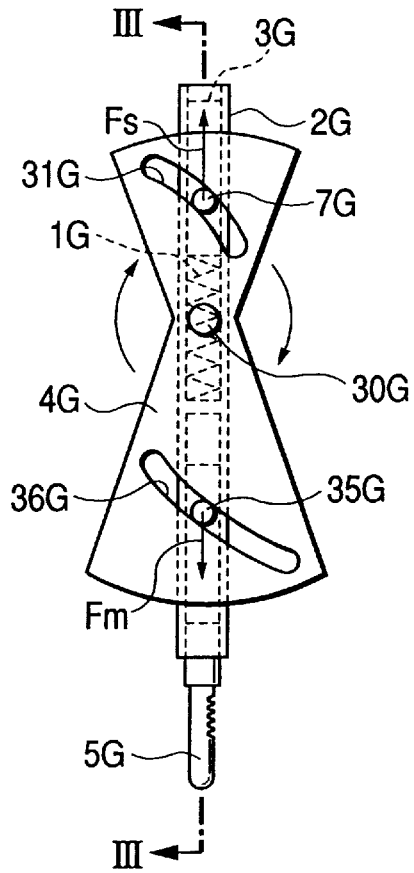
FIG. 10 is a front view of a constant-pressure mechanism according to a seventh embodiment of the present invention.
Figure 11:
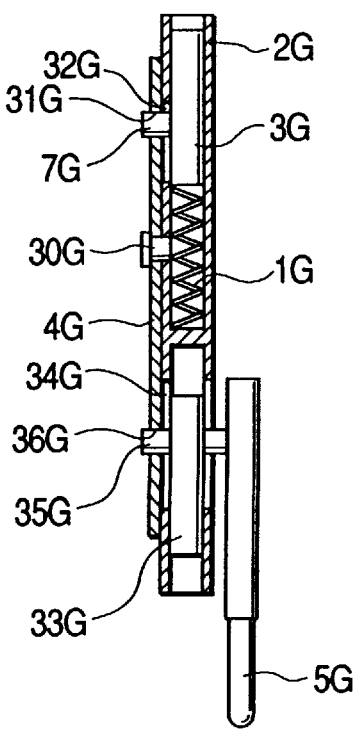
FIG. 11 is a sectional view taken along the line III—III in FIG. 10.

FIGS. 10 and 11 show a constant-pressure mechanism according to a seventh embodiment of the present invention. This constant-pressure mechanism is characterized by using a rotary member 4G driven in accordance with the movement of a pressure transmission member 3G which is linearly moved by a coil spring 1G received in a case 2G. That is, the rotary member 4G is rotatable freely around a central shaft 30G which is disposed on the axis of the pressure transmission member 3G on the outer surface of the case 2G. An urging pin 7G of the pressure transmission member 3G projecting from a long hole 32G formed in the case 2G engages with a first cam curve groove 31G of the rotary member 4G.

Further, a sliding member 33G is disposed in the inside of the case 2G and on the extension of the pressure transmission member 3G so as to be movable in the same direction as the pressure transmission member 3G. A follower pin 35G is fixed on the sliding member 33G so as to project to the outside through a long hole 34G. The follower pin 35G is engaged with a second cam curve groove 36G in the surface of the rotary member 4G, and a contact 5G is fixed to the follower pin 35G. The first and second cam curve grooves 31G and 36G are formed in a substantially circular arc shape so that quadratic curve is approximated by circular curve.

Figure 12:
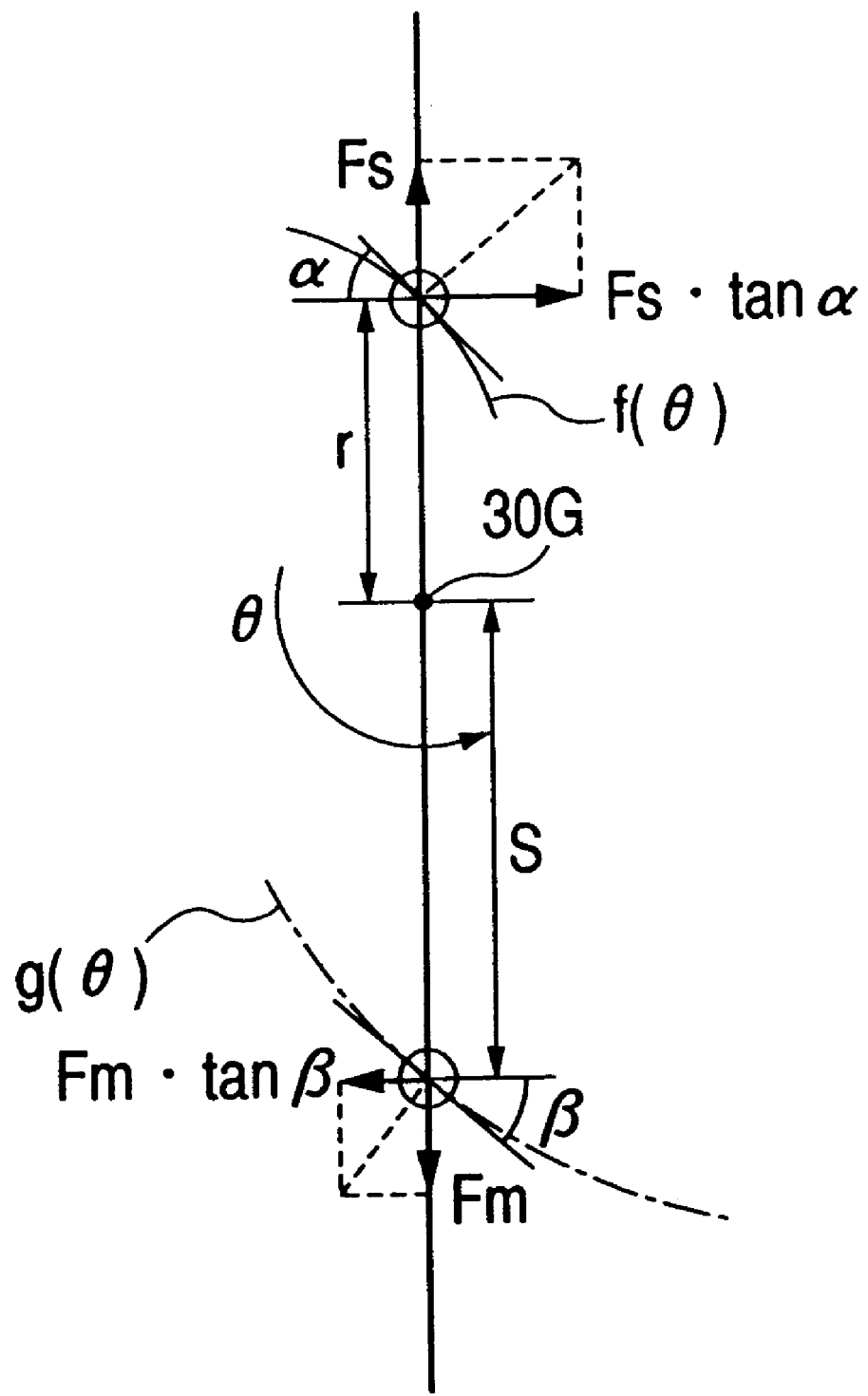
FIG. 12 is a principle explanatory diagram of the constant-pressure mechanism according to the seventh embodiment.

In the seventh embodiment, the relationship between the first cam curve groove 31G and the second cam curve groove 36G is determined as follows. That is, as shown in FIG. 12, polar coordinates are set on the rotary member 4G with the central shaft 30G as a center. Assume that the force of the coil spring 1G is "Fs", the axial force transmitted to the contact 5G is "Fm", the rotation angle of the rotary member 4G around the central shaft 30G is "θ", and the distances from the central shaft 30G to the central line of the first cam curve groove 31G and from the central shaft 30G to the central line of the second cam curve groove 36G are "r" and "s" respectively. Then, the loci drawn on the rotary member 4G by the urging pin 7G and the follower pin 35G are expressed as r=f(θ) and s=g(θ), respectively, which are functions of "θ".

Further, assume that the angle between the first cam curve groove 31G and the plane perpendicular to the axis of the pressure transmission member 3G is "α" at a point where the urging pin 7G contacts with the first cam curve groove 31G, and assume that the angle between a tangent of the second cam curve groove 36G and the plane perpendicular to the axis of the sliding member 33G is "β" at a point where the follower pin 35G contacts with the second cam curve groove 36G.

Here, a force contributed by the force Fs of the coil spring 1G in the rotational direction of the rotary member 4G is Fs·tan α, and a rotation force generating a force Fm transmitted to the contact 5G is Fm·tan β. Because the torques due to the rotation forces are equal to each other, the following equation is established.

$$r \cdot Fs \cdot \tan \alpha = s \cdot Fm \cdot \tan \beta$$

$$\therefore Fm = \frac{r \cdot \tan \alpha}{s \cdot \tan \beta} Fs \quad \text{(Equation 3)}$$

On the other hand, the deflection of the coil spring 1G from its natural length can be expressed by a linear function h(r) Accordingly, if a spring constant is designated by "k", the following equation is established.

$$Fs = k \cdot h(r) \quad \text{(Equation 4)}$$

Further, if an angle is expressed in terms of "radian", the following equations are established.

$$\tan \alpha = \frac{f'(\theta)}{r}$$

$$\tan \beta = \frac{g'(\theta)}{s}$$

Therefore, Equation 3 can be transformed into:

$$Fm = \frac{f'(\theta)}{g'(\theta)} Fs \quad \text{(Equation 5)}$$

Let a and m be constants, then $$f'(\theta) = m$$

Therefore, if f(θ) and g(θ) are selected so that Equation 7 is established as follows.

$$r = f(\theta) = m \cdot \theta + a \quad \text{(Equation 6)}$$

$$g'(\theta) = \pm h(r)$$

Thus, $$s = g(\theta) = \pm \int h(m \cdot \theta + a) d\theta \quad \text{(Equation 7)}$$

Then, Equation 5 can be transformed as follows.

$$Fm = \pm m \cdot k \quad \text{(Equation 8)}$$

That is, Equation 8 shows that the measuring force Fm is constant independently of the value of "θ", that is, the rotation angle of the rotary member 4G.

Here, as a specific example, assume that the coil spring 1G is arranged so that, for example, $$Fs = k \cdot (c + r)$$

is established when the values b and c are constants. Then, Equation 7 can be transformed by using Equation 6 as follows.

$$g'(\theta) = \pm (c + r) = \pm (m \cdot \theta + c + a)$$

Therefore, the following relation can be obtained.

$$s = g(\theta) = \pm \{(\tfrac{1}{2}) \cdot m \cdot \theta^2 + (c + a) \cdot \theta\} + b$$

[Eighth Embodiment]

Figure 13:
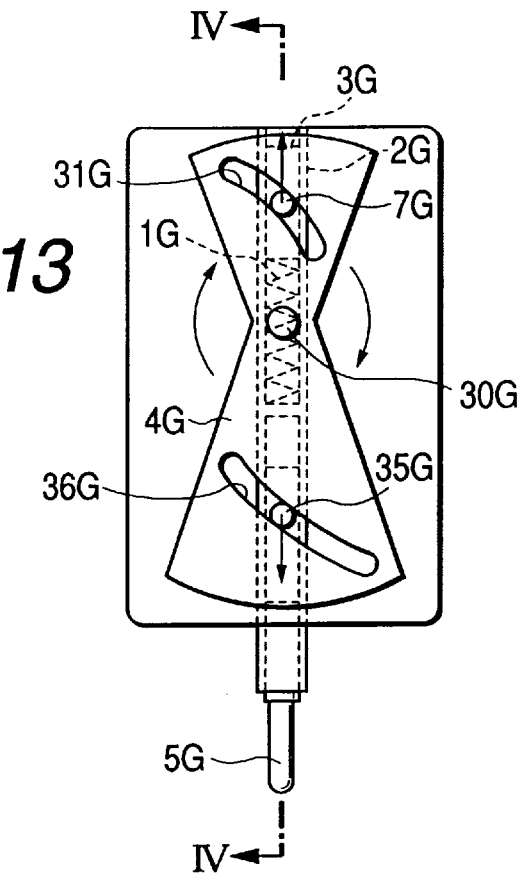
FIG. 13 is a front view of a constant-pressure mechanism according to an eighth embodiment of the present invention.
Figure 14:
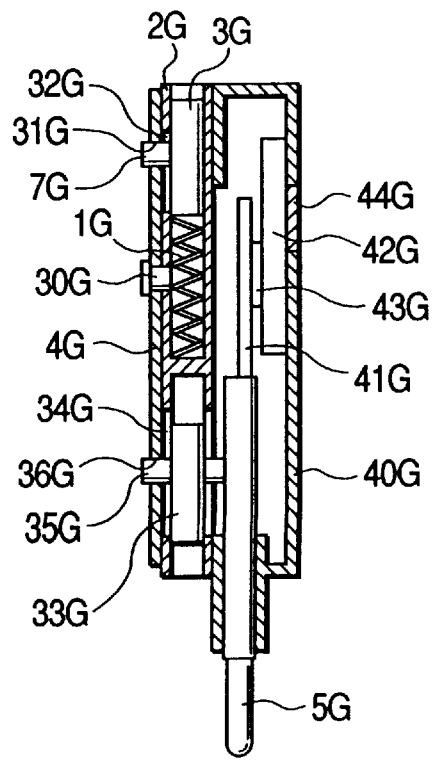
FIG. 14 is a sectional view taken along the line IV—IV in FIG. 13.

FIGS. 13 and 14 show an eighth embodiment of the present invention. In a constant-pressure mechanism according to this embodiment, shown in FIGS. 13 and 14, parts the same as those in the above-mentioned seventh embodiment are referenced correspondingly.

That is, this constant-pressure mechanism has a pressure transmission member 3G which is linearly moved by a coil spring 1G received in a case 2G, and this pressure transmission member 3G is followed by a rotary member 4G which is rotatable freely around a central shaft 30G disposed on the axis of the pressure transmission member 3G and on the outer surface of the case 2G. That is, an urging pin 7G of the pressure transmission member 3G projecting from a long hole 32G formed in the case 2G engages with a first cam curve groove 31G of the rotary member 4G, while a sliding member 33G located on the extension of the pressure transmission member 3G is disposed in the inside of the case 2G.

Also in the eighth embodiment, similarly to the seventh embodiment, a follower pin 35G penetrating a long hole 34G is fixed to the sliding member 33G which is movable in the same direction as the pressure transmission member 3G. A second cam curve groove 36G in the surface of the rotary member 4G engages with this follower pin 35G.

Further, a contact 5G disposed in the inside of a rear case 40G is fixed to the follower pin 35G, and a reference scale 41G extending in the lengthwise direction of the contact is fixed to an inner end portion of the contact 5G. A detection scale 43G mounted on a counting/operation portion 42G faces the surface of this reference scale 41G.

Since the constant-pressure mechanism according to the eighth embodiment is configured as described above, the contact 5G is urged by a substantially constant force independently of the displacement of the contact 5G. A quantity of movement of the contact 5G is monitored by the detection scale 43G, calculated by the counting/operation portion 42G, and indicated on an indicator 44G.

[Ninth Embodiment]

Figure 15:
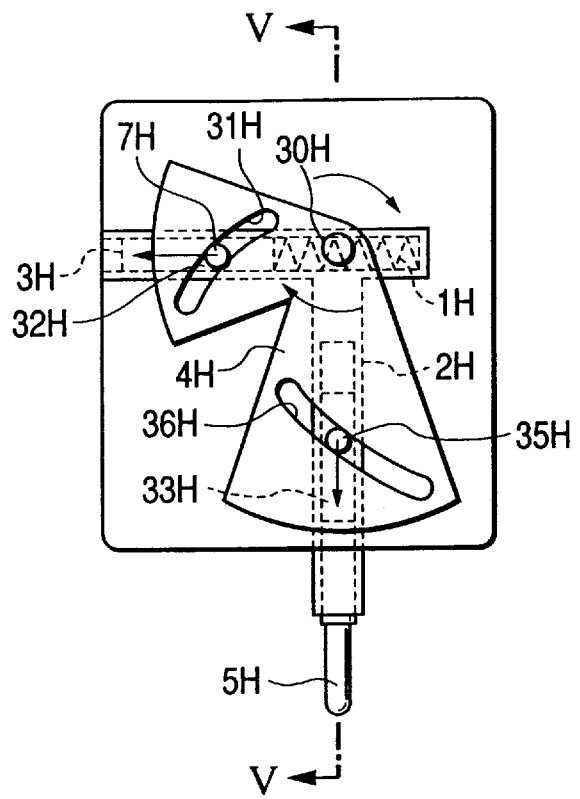
FIG. 15 is a front view of a constant-pressure mechanism according to a ninth embodiment of the present invention.
Figure 16:
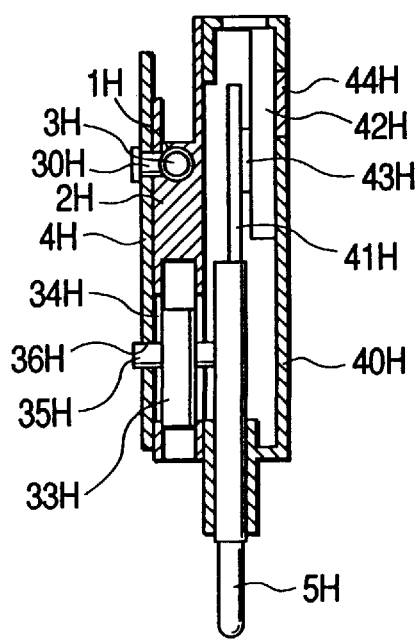
FIG. 16 is a sectional view taken along the line V—V in FIG. 15.

FIGS. 15 and 16 show a ninth embodiment of the present invention. This embodiment is characterized by having a relation that a pressure transmission member and a sliding member intersect each other. That is, this constant-pressure mechanism has a pressure transmission member 3H which is linearly moved by a coil spring 1H received in a case 2H, and this pressure transmission member 3H is followed by a rotary member 4H which is rotatable freely around a central shaft 30H disposed on the axis of the pressure transmission member 3H and on the outer surface of the case 2H. That is, an urging pin 7H of the pressure transmission member 3H projecting from a long hole 32H formed in the case 2H engages with a first cam curve groove 31H of the rotary member 4H. Further, a sliding member 33H is disposed in the inside of the case 2H with an angular relation, for example, at an angle of about 90 degrees around the central shaft 30H with respect to the pressure transmission member 3H.

Further, a follower pin 35H penetrating a long hole 34H is fixed to the sliding member 33H which is movable in its lengthwise direction. A second cam curve groove 36H in the surface of the rotary member 4H engages with the follower pin 35H.

Further, similarly to the above-mentioned eighth embodiment, a contact 5H disposed in the inside of a rear case 40H is fixed to the follower pin 35H, and a reference scale 41H extending in the lengthwise direction of the contact is fixed to an inner end portion of the contact 5H. A detection scale 43H mounted on a counting/operation portion 42H faces the surface of this reference scale 41H. A quantity of displacement of the contact 5H detected by the detection scale 43H is indicated on an indicator 44H.

Since the constant-pressure mechanism according to the ninth embodiment is configured as described above, the contact 5H is urged by a substantially constant force independently of the displacement of the contact 5H, and a quantity of movement of the contact 5H is monitored by the detection scale 43H, calculated by the counting/operation portion 42H, and indicated on the indicator 44H, similarly to the eighth embodiment.

[Tenth Embodiment]

Figure 17:
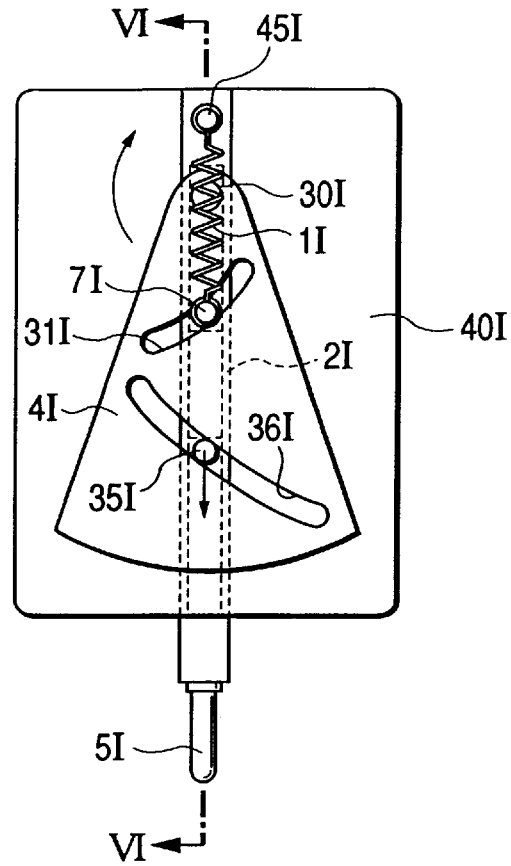
FIG. 17 is a front view of a constant-pressure mechanism according to a tenth embodiment of the present invention.
Figure 18:
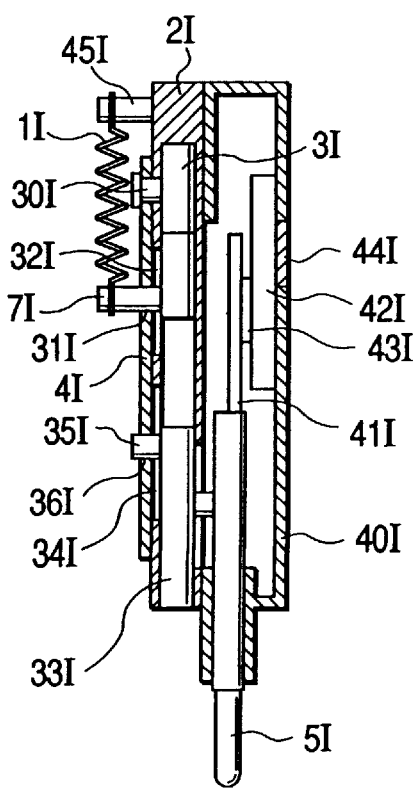
FIG. 18 is a sectional view taken along the line VI—VI in FIG. 17.

FIGS. 17 and 18 show a constant-pressure mechanism according to a tenth embodiment of the present invention. In this embodiment, an tension spring 1I is used instead of a compression spring, and the inclination of a second cam curve groove 36I is made reverse in direction to the inclination of a first cam curve groove 31I.

That is, in this constant-pressure mechanism, a pressure transmission member 3I received in the inside of a case 2I is urged by the tension spring 1I, and this pressure transmission member 3I is followed by a rotary member 4I which is rotatable freely around a central shaft 30I disposed on the axis of the pressure transmission member 3I and on the outer surface of the case 2I. That is, an urging pin 7I of the pressure transmission member 3I projecting from a long hole 32I formed in the case 2I engages with the first cam curve groove 31I of the rotary member 4I, while a free end portion of the tension spring 1I the base end portion of which engages with a support pin 45I in the surface of the case 2I is hooked on this urging pin 7I.

Further, a sliding member 33I located on the extension of the pressure transmission member 3I is disposed in the inside of the case 2I, and a follower pin 35I penetrating a long hole 34I is fixed to the sliding member 33I which is movable in the same direction as the pressure transmission member 3I. A second cam curve groove 36I in the surface of the rotary member 4I engages with this follower pin 35I.

Further, a contact 5I is fixed, at its portion located in a rear case 40I, is fixed to the follower pin 35I, and a reference scale 41I extending in the longitudinal direction of the contact is fixed to an inner end portion of the contact 5I. A detection scale 43I mounted on a counting/operation portion 42I faces the surface of this reference scale 41I.

Since the constant-pressure mechanism according to the tenth embodiment is configured as described above, the contact 5I is urged by a substantially constant force independently of the displacement of the contact 5I, and a quantity of movement of the contact 5I is monitored by the detection scale 43I, calculated by the counting/operation portion 42I, and indicated on an indicator 44I, in the same manner as in the eighth and ninth embodiments.

In the tenth embodiment, if the coil spring 1I is arranged so that the force Fs of the coil spring 1I described above in the seventh embodiment satisfies the following equation, $$Fs = k \cdot (c-r)$$

Equation 7 can be transformed by using Equation 5 as follows.

$$g'(\theta) = \pm (c-r) = \pm (-m \cdot \theta + c - a)$$

Therefore, the following result can be obtained.

$$s = g(\theta) = \pm \{(-\tfrac{1}{2}) \cdot m \cdot \theta^2 + (c-a) \cdot \theta\} + b$$

[Eleventh Embodiment]

Figure 19:
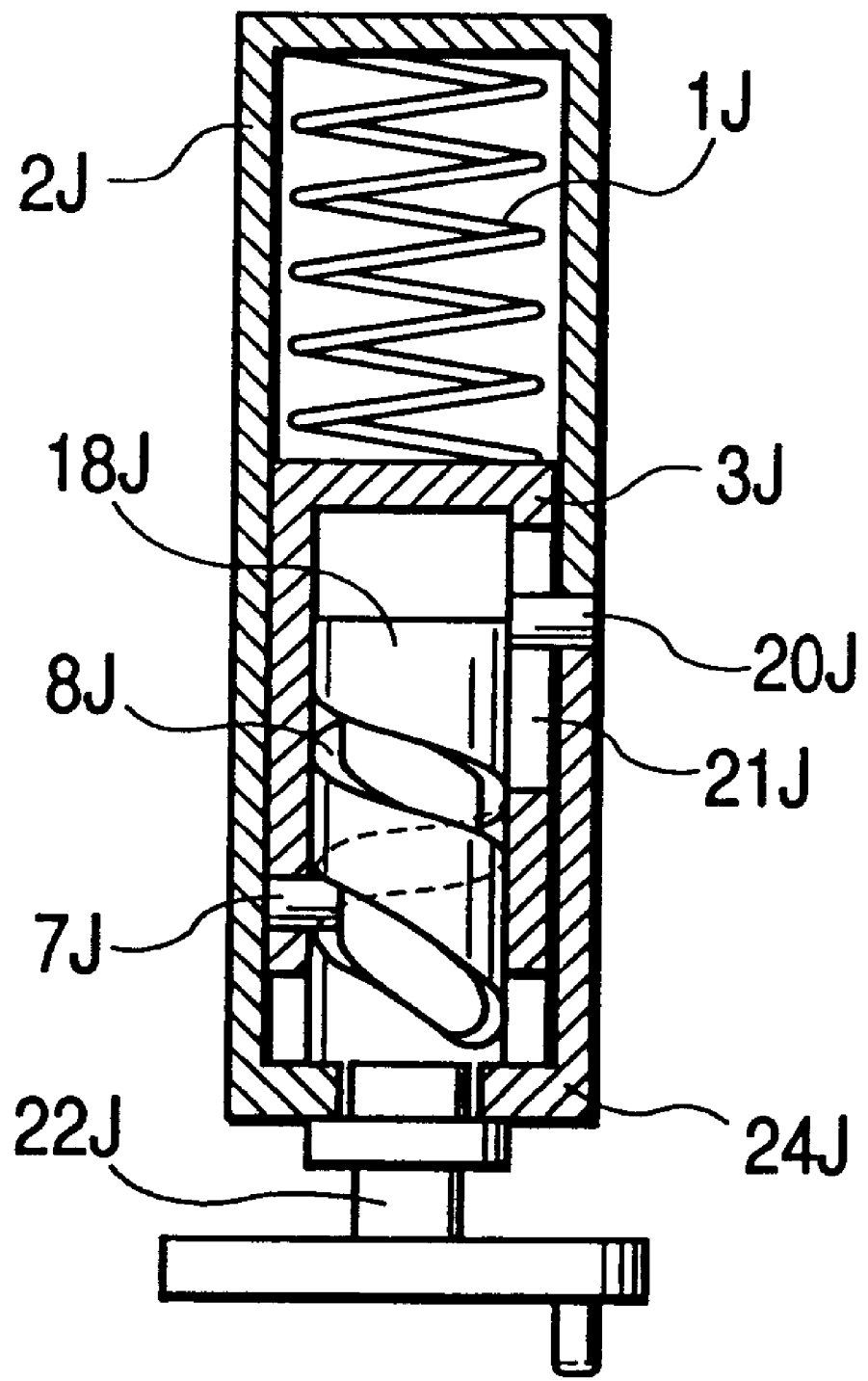
FIG. 19 is a sectional view of a low-torque mechanism according to an eleventh embodiment of the present invention.

FIG. 19 shows a constant-torque mechanism which is an eleventh embodiment of the present invention, in which a pressure transmission sleeve 3J urged downward by a coil spring 1J is received in the inside of a cylindrical case 2J so as to be slidable along a guide groove 21J to which a rotation prevention pin 20J is inserted.

Further, an intermediate shaft 18J which is rotatable freely with respect to the pressure transmission sleeve 3J but is prevented from moving in the axial direction by a flange 24J is disposed in the inside of the pressure transmission sleeve 3J. A rotary disk 22J for imparting torque to an external subject to be measured (not shown) is fixed to an outer end portion of this intermediate shaft 18J.

Further, a quadratic curve circumferential-surface groove 8J in which an urging pin 7J projecting from the pressure transmission sleeve 3J is disposed is formed in the circumferential surface of the aforementioned intermediate shaft 18J. Therefore, when the pressure transmission sleeve 3J is to move by the elastic force of the coil spring 1J, a quantity of movement of the pressure transmission sleeve 3J is converted into a quadratic-functional displacement of the rotation angle of the intermediate shaft 18J and the rotary disk 22J.

Therefore, in the constant-torque mechanism according to the eleventh embodiment, constant torque can be imparted to the rotary disk 22J with a simple structure, so that it is possible to apply the mechanism to a measuring apparatus such as a caliper gauge.

[Twelfth Embodiment]

Figure 20:
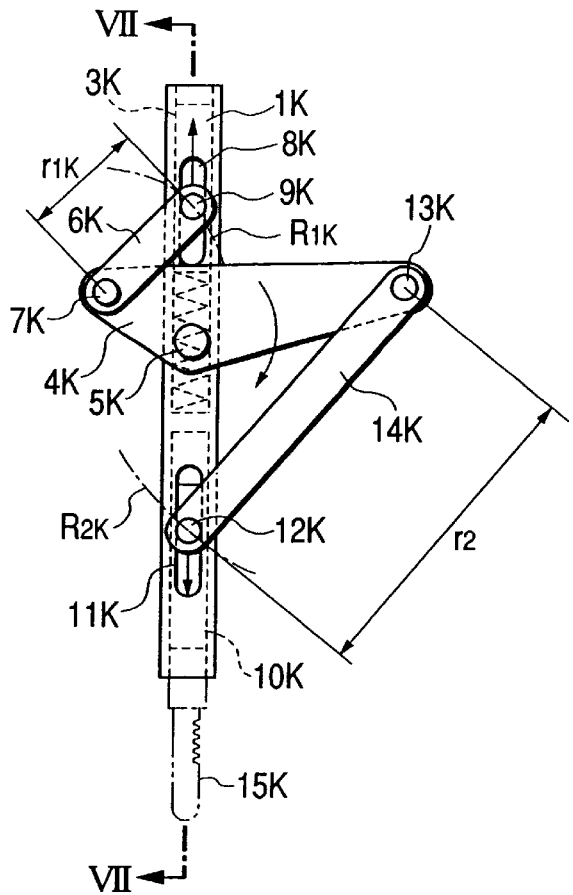
FIG. 20 is a front view of a constant-pressure mechanism according to a twelfth embodiment of the present invention.
Figure 21:
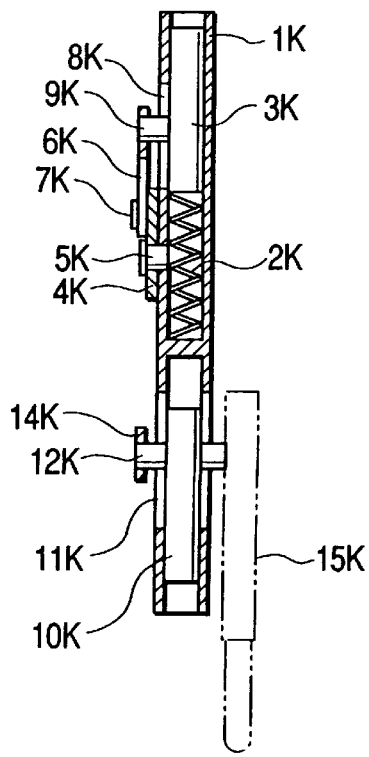
FIG. 21 is a sectional view taken along the line VII—VII in FIG. 20.

FIGS. 20 and 21 show a constant-pressure mechanism according to a twelfth embodiment of the present invention. This constant-pressure mechanism is characterized by using a rotary member 4K moved in accordance with the movement of a pressure transmission member 3K which is linearly moved by a coil spring 2K received in a case 1K. That is, the rotary member 4K is rotatable freely around a central shaft 5K disposed on the axis of the pressure transmission member 3K and on the outer surface of the case 1K. One end of a first link arm 6K is connected to one end portion of the rotary member 4K through a pin 7K, while the other end of the first link arm 6K engages with an urging pin 9K of the pressure transmission member 3K projecting out from a long hole 8K formed in the case 1K.

Further, a sliding member 10K located on the extension of the pressure transmission member 3K is disposed in the inside of the case 1K. A follower pin 12K projecting to the outside through a long hole 11K is fixed to the sliding member 10K which is movable in the same direction as the pressure transmission member 3K. One end of a second link arm 14K is connected to the other end portion of the above-mentioned rotary member 4K through a pin 13K, while the other end of the second link arm 14K is pin-connected to this follower pin 12K.

A contact 15K having a tip which is able to contact with a surface to be measured is fixed to the outer end portion of the follower pin 12K projecting outside the case 1K.

Therefore, in the twelfth embodiment, the first cam curve groove 31G and the second cam curve groove 36G in the seventh embodiment (that is, the center positions and the radiuses of the first cam curve groove 31G and the second cam curve groove 36G which are formed in a circular arc shape) are approximated by a first arc $R_{1K}$ of a radius $r_{1K}$ around the pin 7K and a second arc $R_{2K}$ of a radius $r_{2K}$ around the pin 13K respectively. However, a similar effect can be obtained also in this structure, as will be described below.

Figure 22:
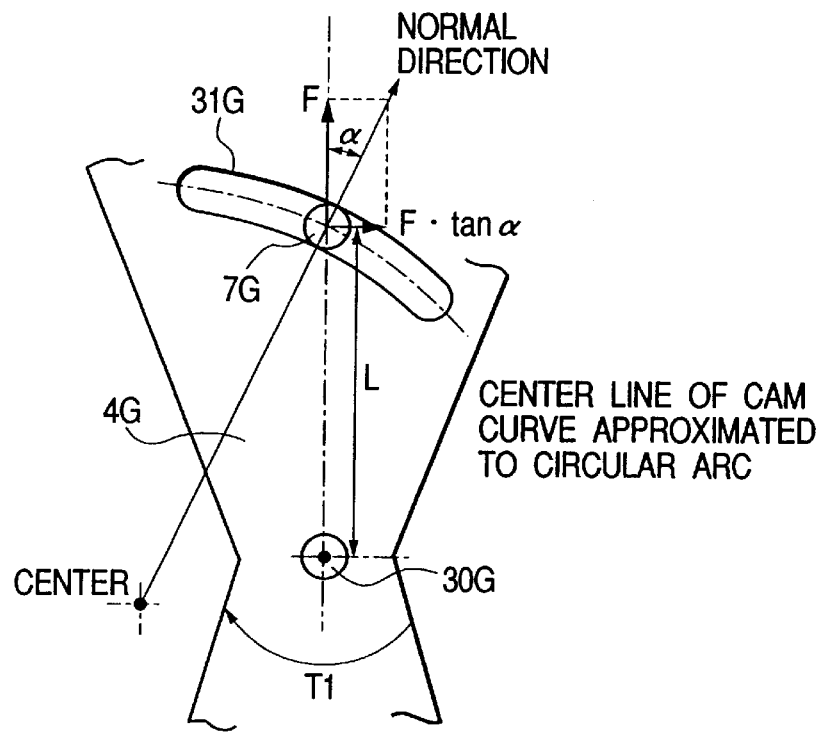
FIG. 22 is an explanatory diagram of torque T1 around the center of a rotary member 30G of the constant-pressure mechanism according to the seventh embodiment.
Figure 23:
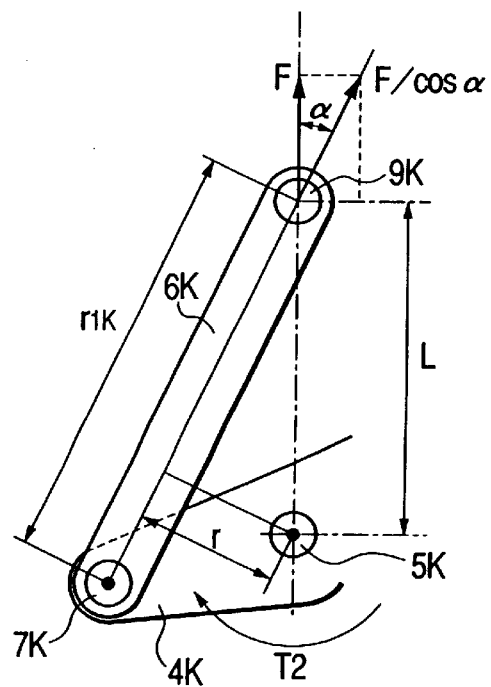
FIG. 23 is an explanatory diagram of torque T2 around the center of a rotary member of the constant-pressure mechanism according to the twelfth embodiment.

That is, FIG. 22 shows the relationship of force around the first cam curve groove 31G in the seventh embodiment, while FIG. 23, in contrast with FIG. 22, shows the relationship of force around the center axis 5K acting on the first link arm 6K connected to one end portion of the rotary member 4K.

In FIGS. 22 and 23, assume that the urging pins 7G, 9A are respectively disposed at a distance "L" from the central shafts 30G, 5K of the rotary members 4G, 4K, and consider the case where force "F" is given from the coil springs 2G, 2K to the urging pins 7G, 9K. Then, the normal to the surface of the first cam curve groove 31G in the position of the urging pin 7G in FIG. 22 is the same as the central line of the first link arm 6K in FIG. 23. Assume that an angle of the normal (central line) with respect to the direction of movement of the urging pins 7G, 9K is "α". Further, assuming that a distance between the central shaft 5K of the rotary member 4K and the central line of the first link arm 6K in FIG. 23 is "r", the force imparted to the urging pin 9K and the torque applied to the rotary member 4K are expressed as follows.

That is, torque T1 around the central shaft 30G acting on the rotary member 4G in FIG. 22 is expressed by:

$$T1 = L \cdot F \cdot \tan \alpha \qquad \text{(Equation 9)}$$

Torque T2 around the central axis 5K acting on the rotary member 4K in FIG. 23 is expressed by:

$$T2 = rF/\cos \alpha$$
$$= L \cdot \sin \alpha \cdot F/\cos \alpha$$
$$= L \cdot F \cdot \tan \alpha \qquad \text{(Equation 10)}$$

Therefore, as is understood from the comparison between Equation 9 and Equation 10, T1 and T2 in the models of FIGS. 22 and 23 are quite the same, and both the mechanisms are regarded as transmission mechanisms having equivalent forces to each other. However, the mechanism in FIG. 23 is regarded as a transmission mechanism having a stable force because the mechanism does not use the first cam curve groove 31G having a large frictional resistance.

In addition, the second link arm 14K connected to the other end portion of the rotary member 4K also provides a stable transmission mechanism because the mechanism is constituted without the second cam curve groove 32G having a large frictional resistance of the seventh embodiment. The rolling friction according to the link mechanism of this embodiment is much smaller than the sliding friction of the cam curve groove of the seventh embodiment.

[Thirteenth Embodiment]

Figure 24:
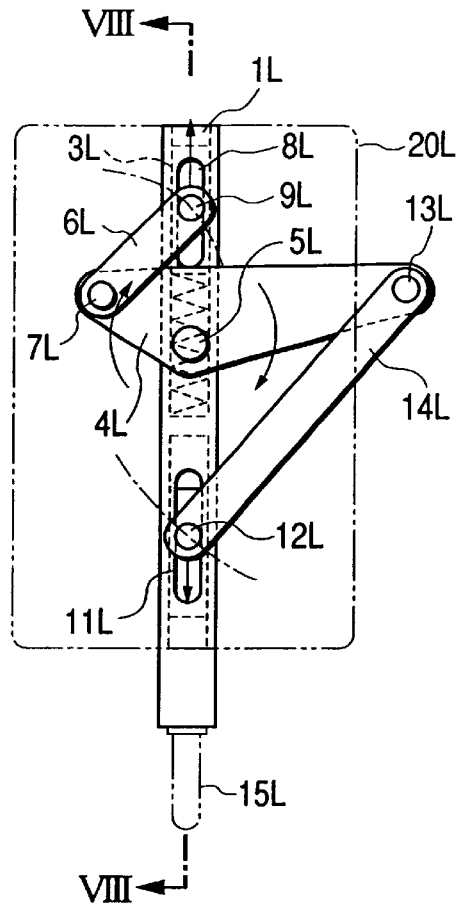
FIG. 24 is a front view of a constant-pressure mechanism according to a thirteenth embodiment of the present invention.
Figure 25:
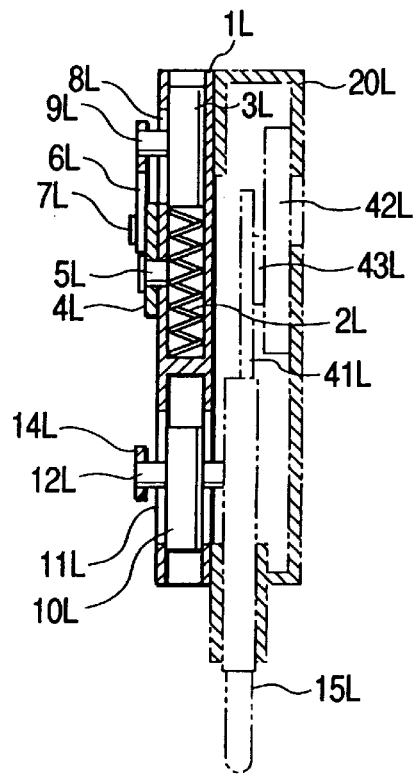
FIG. 25 is a sectional view taken along the line VIII—VIII in FIG. 24.

FIGS. 24 and 25 show a thirteenth embodiment of the present invention. Similarly to the constant pressure mechanism in the twelfth embodiment of the present invention, a constant-pressure mechanism according to this embodiment uses a rotary member 4L moved in accordance with the movement of a pressure transmission member 3L which is linearly moved by a coil spring 2L received in a case 1L. The rotary member 4L is rotatable freely around a central shaft 5L disposed on the axis of the pressure transmission member 3L and on the outer surface of the case 1L. One end of a first link arm 6L is connected to one end portion of the rotary member 4L through a pin 7L, while the other end of this first link arm 6L engages with an urging pin 9L of the pressure transmission member 3L projecting from a long hole 8L formed in the case 1L.

Further, a sliding member 10L located on the extension of the pressure transmission member 3L is disposed in the inside of the case 1L. A follower pin 12L projecting to the outside through a long hole 11L is fixed to the sliding member 10L which is movable in the same direction as the pressure transmission member 3L. One end of a second link arm 14L is connected to the other end portion of the above-mentioned rotary member 4L through a pin 13L, while the other end of the second link arm 14L is pin-connected to the follower pin 12L, in the same manner as the case of the twelfth embodiment.

A contact 15L disposed in the inside of a rear case 20L is fixed to the follower pin 12L, and a reference scale 41L extending in the lengthwise direction of the contact 15L is fixed to an inner end portion of the contact 15L. A detection scale 43L mounted on a counting/operation portion 42L faces the surface of the reference scale 41L.

Since the constant-pressure mechanism according to the thirteenth embodiment is configured as described above, the contact 15L is urged by a substantially constant force independently of the displacement of the contact 15L. A quantity of movement of the contact 15L is monitored by the detection scale 43L, calculated by the counting/operation portion 42L, and indicated on an indicator 44L.

[Fourteenth Embodiment]

Figure 26:
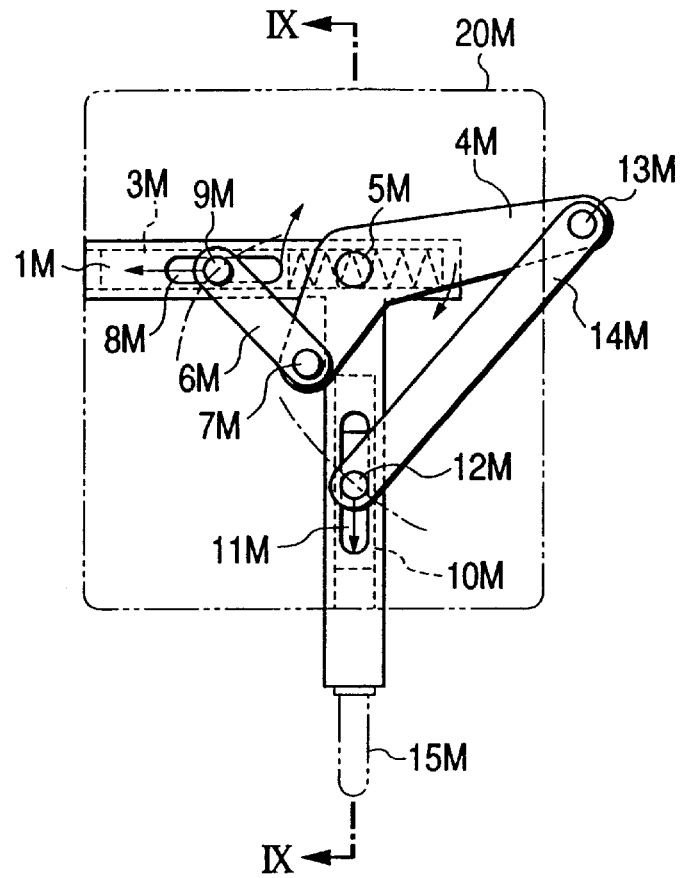
FIG. 26 is a front view of a constant-pressure mechanism according to a fourteenth embodiment of the present invention.
Figure 27:
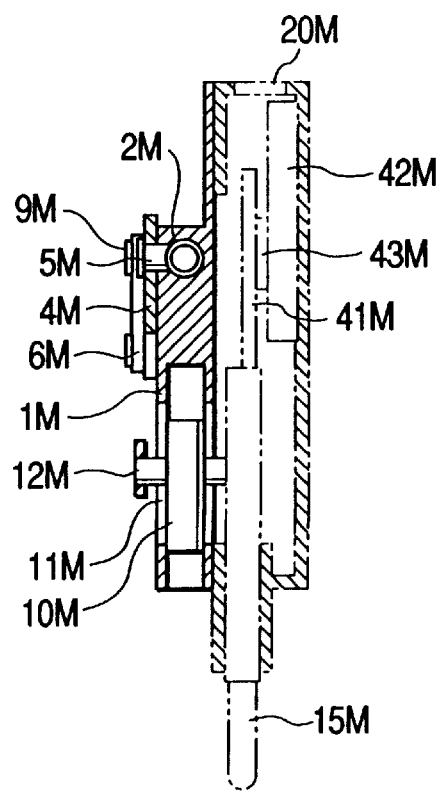
FIG. 27 is a sectional view taken along the line IX—IX in FIG. 26.

FIGS. 26 and 27 show a fourteenth embodiment of the present invention. This embodiment is characterized by having a relation that a pressure transmission member 3M and a sliding member 10M intersect each other. That is, this constant-pressure mechanism has the pressure transmission member 3M which is linearly moved by a coil spring 2M received in a case 1M, and the pressure transmission member 3M is followed by a rotary member 4M which is rotatable freely around a central shaft 5M disposed on the axis of the pressure transmission member 3M and on the outer surface of the case 1M. That is, one end of a first link arm 6M is connected to a left end portion of the rotary member 4M having a bell crank shape through a pin 7M. The other end of the first link arm 6M engages with an urging pin 9M of the pressure transmission member 3M projecting from the long hole 8M formed in the case 1M. Further, a sliding member 10M is disposed in the inside of the case 1M with an angular relation, for example, at an angle of about 90 degrees around the central shaft 5M with respect to the pressure transmission member 3M.

A follower pin 12M penetrating a long hole 11M is fixed to the sliding member 10M which is movable in its lengthwise direction. A second link arm 14M is connected to a right end portion of the rotary member 4M through a pin 13M at one end thereof and is pin-connected to the follower pin 12M at the other end thereof.

Further, similarly to the above-mentioned thirteenth embodiment, a contact 15M disposed in the inside of a rear case 20M is fixed to the follower pin 12M, and a reference scale 41M extending in the lengthwise direction of the contact 15M is fixed to an inner end portion of the contact 15M. A detection scale 43M mounted on a counting/operation portion 42M faces the surface of this reference scale 41M. A quantity of displacement of the contact 15M detected by the detection scale 43M is indicated on an indicator 44M.

Since the constant-pressure mechanism according to the fourteenth embodiment is configured as described above, the contact 15M is urged by a substantially constant force independently of the displacement of the contact 15M, and a quantity of movement of the contact 15M is monitored by the detection scale 43M, calculated by the counting/operation portion 42M, and indicated on the indicator 44M, similarly to the thirteenth embodiment.

[Fifteenth Embodiment]

Figure 28:
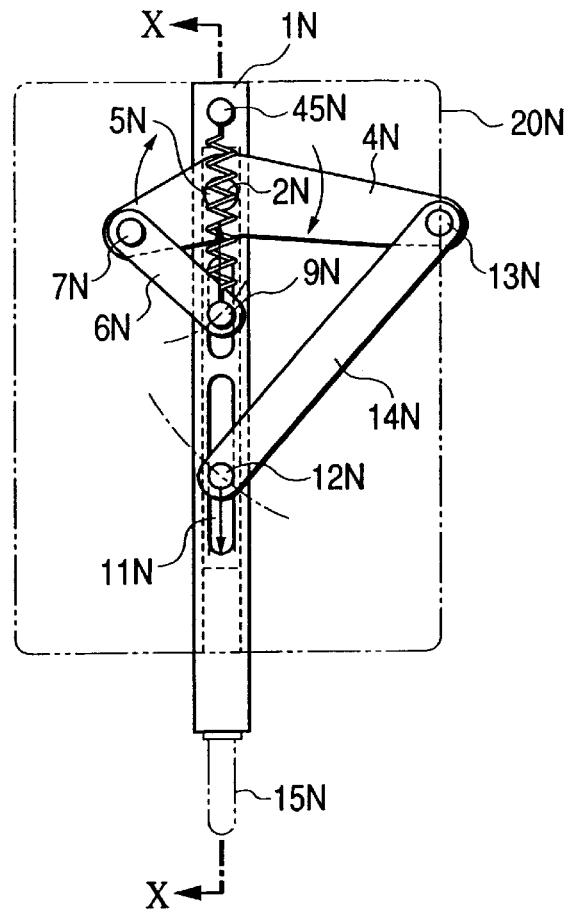
FIG. 28 is a front view of a constant-pressure mechanism according to a fifteenth embodiment of the present invention.
Figure 29:
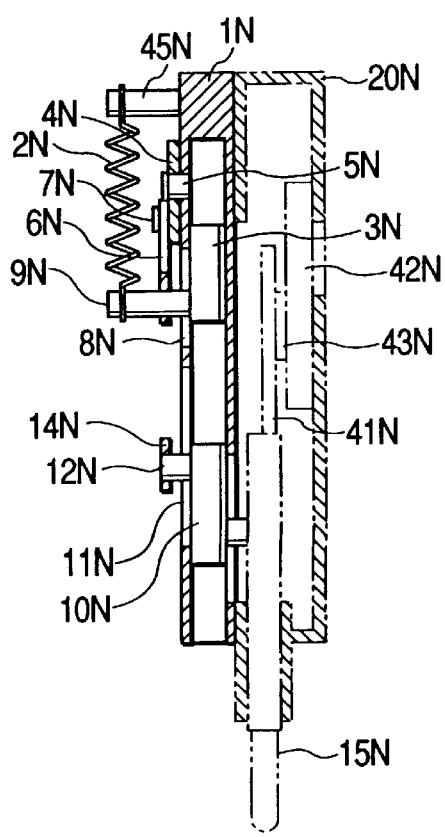
FIG. 29 is a sectional view taken along the line X—X in FIG. 28.

FIGS. 28 and 29 show a constant-pressure mechanism according to a fifteenth embodiment of the present invention. In this embodiment, an tension spring 2N is used instead of a compression spring.

That is, in this constant-pressure mechanism, a pressure transmission member 3N received in the inside of a case 1N is urged by the tension spring 2N, and this pressure transmission member 3N is followed by a rotary member 4N which is rotatable freely around a central shaft 5N disposed on the axis of the pressure transmission member 3N and on the outer surface of the case 1N. That is, one end of a first link arm 6N is connected to a left end portion of the rotary member 4N and the other end of the first link arm 6N engages with an urging pin 9N of the pressure transmission member 3N projecting from a long hole 8N formed in the case 1N, while a free end portion of the tension spring 2N the base end portion of which engages with a support pin 45N in the surface of the case 1N is hooked on the urging pin 9N.

Further, a sliding member 10N located on the extension of the pressure transmission member 3N is disposed in the inside of the case 1N, and a follower pin 12N penetrating a long hole 11N is fixed to the sliding member 10N which is movable in the same direction as the pressure transmission member 3N. A second link arm 14N is connected to the other end portion of the rotary member 4N at one end thereof through a pin 13N and is pin-connected to the follower pin 12N at the other end thereof.

In addition, a contact 15N is fixed, at its portion located in a rear case 40N, is fixed to the follower pin 12N, and a reference scale 41N extending in the longitudinal direction of the contact 15N is fixed to an inner end portion of the contact 15N. A detection scale 43N mounted on a counting/operation portion 42N faces the surface of this reference scale 41N.

Since the constant-pressure mechanism according to the fifteenth embodiment is configured as described above, the contact 15N is urged by a substantially constant force independently of the displacement of the contact 15N, and a quantity of movement of the contact 15N is monitored by the detection scale 43N, calculated by the counting/operation portion 42N, and indicated on an indicator 44N, in the same manner as in the thirteenth and fourteenth embodiments.

The present invention is not limited to the above-mentioned embodiments, but its modifications may be carried out as follows.

1) It is possible to reduce frictional resistance so long as the urging pin, the follower pin, the guide pin, and the rotation prevention pin in the above-mentioned embodiments are of a roller type.

2) The quadratic curve cam groove (quadratic curve circumferential-surface groove) and the direction conversion cam groove (motion conversion circumferential-surface groove) may be permuted with each other in the third, fifth and sixth embodiments.

3) The male and female relation among the pressure transmission sleeve, the follower sleeve, and the intermediate shaft maybe reversed in the fifth, sixth and eleventh embodiments.

As apparent from the above description, according to any constant-pressure mechanism of the present invention, the structure is simple and the size is small. Not only it is possible to always urge a follower member by a constant force independently of a quantity of movement of the follower member, but also it is possible to obtain a structure adapted for a detection head portion of a contact-type measuring apparatus, with a small frictional resistance because the constant-pressure mechanism does not use a cum curve groove having a large frictional resistance.

Further, according to the constant-torque mechanism of the present invention, it is possible to obtain a structure suitable for a detection head portion of a caliper gauge.

The present disclosure relates to the subject matter contained in Japanese patent applications No. Hei10-82788 filed on Mar. 13, 1998 and No. Hei10-315469 filed on Oct. 19, 1998 which are expressly incorporated herein by reference in its entirety.

What is claimed is:

1. A constant-pressure mechanism comprising:
   a pressure transmission member being linearly movable in a predetermined direction and being urged by an urging member;
   a rotary member being rotatable around a central shaft located in a case receiving said pressure transmission member;
   a follower member supported to said case so as to be movable linearly; and
   a displacement conversion mechanism interposed among said pressure transmission member, said rotary member and said follower member, said displacement conversion mechanism having a first link arm pin-connected between one end portion of said rotary member and said pressure transmission member, and a second link arm pin-connected between the other end portion of said rotary member and said follower member.

2. The constant-pressure mechanism according to claim 1, wherein said follower member is supported along a direction substantially parallel to the predetermined direction.

3. The constant-pressure mechanism according to claim 2, wherein said follower member is aligned with said pressure transmission member so as to be guided along the same direction as the movement of said pressure transmission member.

4. The constant-pressure mechanism according to claim 1, wherein said follower member is supported along a direction substantially perpendicular to the predetermined direction.

5. The constant-pressure mechanism according to claim 1, wherein said urging member is constituted by a tension coil spring.

6. The constant-pressure mechanism according to claim 1, wherein a contact of a contact measuring apparatus is fixed to said follower member.

7. The constant-pressure mechanism according to claim 1, wherein a contact of a contact measuring apparatus is formed in a portion of said follower member.

8. A constant-pressure mechanism comprising:
a pressure transmission member being linearly movable in a predetermined direction and being urged by an urging member;
a follower member being linearly movable and interlocking with the movement of said pressure transmission member; and
a displacement conversion cam mechanism interposed between said pressure transmission member and said follower member, said displacement conversion cam mechanism converting a quantity of movement of one of said pressure transmission member and said follower member into a quantity of quadratic-functional movement of the other of said pressure transmission member and said follower member.

9. The constant-pressure mechanism according to claim 8, wherein a contact of a contact measuring apparatus is fixed to said follower member.

10. The constant-pressure mechanism according to claim 8, wherein a contact of a contact measuring apparatus is formed in a portion of said follower member.

11. The constant-pressure mechanism according to claim 8, wherein said follower member is guided and supported along a direction substantially perpendicular to the predetermined direction.

12. The constant-pressure mechanism according to claim 8, wherein said follower member is guided and supported along a direction substantially parallel to the predetermined direction.

13. The constant-pressure mechanism according to claim 12, further comprising:
an intermediate member being movable substantially perpendicular to the predetermined direction,
wherein said displacement conversion cam mechanism comprises:
a movement-quantity conversion cam mechanism for converting a quantity of movement of one of said pressure transmission member and said follower member into a quantity of quadratic-functional movement of said intermediate member; and
a motion conversion cam portion for converting a quantity of the movement of said intermediate member into a quantity of movement in the direction of movement of the other of said pressure transmission member and said follower member.

14. The constant-pressure mechanism according to claim 12, wherein said pressure transmission member is constituted by a pressure transmission sleeve being slidably received in the inside of a cylindrical case but being prevented from rotating;
said follower member is constituted by a follower sleeve being slidably received in the inside of said cylindrical case but being prevented from rotating, and said follower sleeve being aligned with said pressure transmission sleeve;
an intermediate shaft being rotatable freely is received between said pressure transmission sleeve and said follower sleeve; and
said displacement conversion cam mechanism comprises:
a movement-quantity conversion cam portion defining a quadratic-functional relation between a quantity of movement of one of said pressure transmission sleeve and said follower sleeve and a rotation angle of said intermediate shaft, and a motion conversion cam portion converting rotational motion of said intermediate shaft into a quantity of linear movement of the other of said pressure transmission sleeve and said follower sleeve.

15. The constant-pressure mechanism according to claim 8, further comprising:
a rotary member being rotatable around a central shaft located in a case receiving said pressure transmission member,
wherein said displacement conversion cam mechanism is disposed among said pressure transmission member, said rotary member and said follower member, and said displacement conversion cam mechanism converts a quantity of movement of said pressure transmission member into a quantity of quadratic-functional movement of said follower member.

16. The constant-pressure mechanism according to claim 15, wherein said displacement conversion cam mechanism is constructed by a quadratic-functional cam groove formed in said rotary member.

17. A constant-torque mechanism for imparting torque to a rotary disk supported rotatably by an elastic force of an urging member, comprising;
a pressure transmission sleeve received in the inside of a cylindrical case so as to be slidable but being prevented from rotating in a state where said pressure transmission sleeve is urged by the urging member;
an intermediate shaft which is rotatable freely and which acts as a support shaft for said rotary disk received in the inside of said pressure transmission sleeve; and
a displacement conversion cam mechanism interposed between said pressure transmission sleeve and said intermediate shaft, for converting a quantity of movement of said pressure transmission sleeve into a quadratic-functional rotational angle of said intermediate shaft.

* * * * *

UNITED STATES PATENT AND TRADEMARK OFFICE
CERTIFICATE OF CORRECTION

PATENT NO. : 6,128,968
DATED : October 10, 2000
INVENTOR(S) : Shingo NISHINA

It is certified that error appears in the above-identified patent and that said Letters Patent is hereby corrected as shown below:

[73] Assignee:   delete "Mitutuyo" and insert --Mitutoyo--.

Signed and Sealed this

Twenty-second Day of May, 2001

Attest:

NICHOLAS P. GODICI

Attesting Officer        Acting Director of the United States Patent and Trademark Office